United States Patent [19]

Raue

[11] 4,248,775
[45] Feb. 3, 1981

[54] PREPARATION OF SOLUTIONS OF AZO METHINE BASIC DYESTUFFS

[75] Inventor: Roderich Raue, Leverkusen, Fed. Rep. of Germany

[73] Assignee: Bayer Aktiengesellschaft, Leverkusen, Fed. Rep. of Germany

[21] Appl. No.: 657,031

[22] Filed: Feb. 11, 1976

[30] Foreign Application Priority Data

Feb. 15, 1975 [DE] Fed. Rep. of Germany ....... 2506444

[51] Int. Cl.³ .................. C09B 43/00; C09B 46/00; D06P 3/76
[52] U.S. Cl. .................................. 260/154; 260/152; 260/155; 260/156; 260/157; 260/158; 260/165; 260/208
[58] Field of Search ............... 260/154, 157, 158, 156, 260/165, 152, 155, 208; 8/177 AB

[56] References Cited

U.S. PATENT DOCUMENTS

| | | | |
|---|---|---|---|
| 3,331,831 | 7/1967 | Raue et al. | 260/162 |
| 3,345,355 | 10/1967 | Raue | 260/165 |
| 3,718,642 | 2/1973 | Lehment et al. | 260/165 |
| 3,741,982 | 6/1973 | Fujino et al. | 260/326.15 |
| 3,769,279 | 10/1973 | Kulthau et al. | 260/240 G |
| 3,773,764 | 11/1973 | Lehment et al. | 260/240 G |
| 3,829,418 | 8/1974 | Raue et al. | 260/240 G |
| 3,840,518 | 10/1974 | Schmitt et al. | 260/164 |

FOREIGN PATENT DOCUMENTS

| | | | |
|---|---|---|---|
| 2509622 | 9/1975 | Fed. Rep. of Germany | 260/165 |
| 1232714 | 5/1971 | United Kingdom | 260/240 G |

Primary Examiner—Floyd D. Higel
Attorney, Agent, or Firm—Sprung, Felfe, Horn, Lynch & Kramer

[57] ABSTRACT

Stable concentrated solutions of basic dyestuffs of the formula

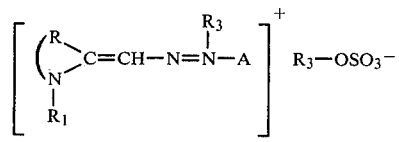

wherein
R denotes the remaining part of a 5- or 6-membered heterocyclic ring,
$R_1$ denotes optionally substituted alkyl, alkenyl, cycloalkyl, aralkyl or aryl,
$R_3$ denotes alkyl and
A denotes an aromatic or heterocyclic radical
are prepared by reacting bases of the formula

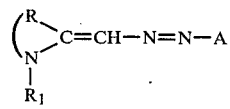

with dialkyl sulphates of the formula

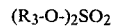

in organic solvents which are completely or partially miscible with water and which do not react with the dialkyl sulphates or react with these more slowly than the dye bases.

1 Claim, No Drawings

PREPARATION OF SOLUTIONS OF AZO METHINE BASIC DYESTUFFS

A process for the preparation of basic dyestuffs of the general formula

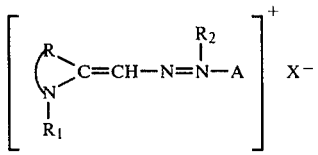

wherein
- R denotes the remaining part of a 5-membered or 6-membered heterocyclic ring,
- $R_1$ denotes an alkyl, cycloalkyl, aralkyl or aryl radical,
- $R_2$ denotes an alkyl, cycloalkyl or aralkyl radical,
- A denotes an aromatic or heterocyclic radical, and
- X denotes an acid radical is known from French Patent Specification 1,214,896. This process is characterised in that dye bases of the general formula

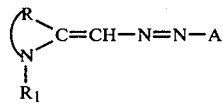

wherein
R, $R_1$ and A have the meaning indicated in the formula (I),
are reacted with alkylating agents.

The dye bases mentioned are prepared by coupling diazotised amines of the general formula (IV) with monomethylene bases of the general formula (III) in a known manner and converting the resulting dye salts of the general formula (V) into the dye bases (II) using aqueous alkalis:

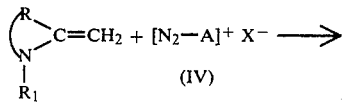

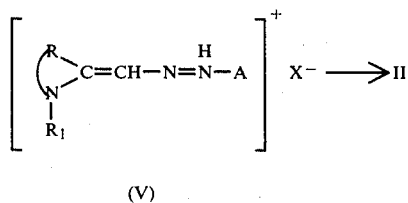

In the formulae (III), (IV) and (V), R, $R_1$, A and X have the meaning indicated in the formula (I).

After quaternisation is complete, the dye salts of the formula (I) are isolated in a known manner by salting them out of their aqueous solutions, filtering them off and drying.

Recently, dyestuffs in a liquid formulation have been used to an increasing extent in dyeing since these do not have the disadvantage of dusting and, moreover, offer the possibility of continuous dosage. Hitherto, the dyestuffs of the general formula (I) have been dissolved, after they have been isolated, in an organic solvent, optionally with the addition of water and/or an organic acid, and marketed as a liquid formulation.

It has now been found that solutions of these dyestuffs can be produced without isolating the dyestuffs after the alkylation.

The subject of the invention is the preparation of solutions of basic dyestuffs of the formula

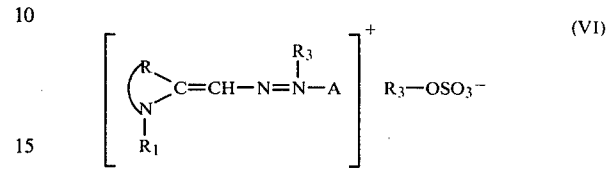

wherein
- R denotes the remaining part of a 5-membered or 6-membered heterocyclic ring,
- $R_1$ denotes an optionally substituted alkyl, alkenyl, cycloalkyl, aralkyl or aryl radical,
- $R_3$ denotes an alkyl radical and
- A denotes an aromatic or heterocyclic radical, by reacting dye bases of the formula (II) with dialkyl sulphates of the formula

in those organic solvents which are completely or partially miscible with water and which, under the alkylating conditions, do not react with the dialkyl sulphates or react with these more slowly than the dye bases (II).

Examples of suitable solvents are: aliphatic carboxylic acid esters; esters which are derived from formic acid or from optionally substituted monobasic or dibasic, saturated or unsaturated carboxylic acids with 1-4 C atoms in the alkyl or alkylene radical and from monohydric, dihydric or trihydric alkyl alcohols with 1-4 C atoms are preferred. The acids can be substituted, for example by cyano groups, or the alkyl or alkylene radical can be interrupted by a carbonyl group; examples which may be mentioned are: methyl esters and ethyl esters of orthoformic acid, acetic acid, propionic acid, acetoacetic acid and cyanoacetic acid, dimethyl esters and diethyl esters of oxalic acid, malonic acid, succinic acid, glutaric acid, adipic acid, maleic acid and acetonedicarboxylic acid, ethylene glycol diacetate and glycerol triacetate. The dihydric and trihydric alcohols can be etherified with 1 or 2 $C_1$-$C_4$-alkyl groups, for example $C_1$-$C_4$-alkyl-ethylene glycol acetate. The acids can also be esterified with polyglycols or the ethers thereof, preferred polyglycols are di-, tri- or tetra-ethylene glycol, which optionally are etherified by a $C_1$-$C_4$-alkyl group, for example methyldiglycol acetate and diglycol diacetate; alkyl ethers of polyhydric alcohols and polyether-alcohols; $C_1$-$C_4$-alkyl ethers of dihydric and trihydric $C_2$-$C_4$-alkyl alcohols or of di-, tri- or tetra-ethylene glycols are preferred. Examples are ethylene glycol dimethyl ether and ethylene glycol diethyl ether, di- and tri-ethylene glycol dimethyl ether and di- and tri-ethylene glycol diethyl ether and glycerol 1,3-diethyl ether; lactones, cyclic esters of carbonic acid and cyclic ethers; aliphatic derivatives such as γ-butyrolactone, ethylene carbonate and propylene carbonate and tetrahydrofurane are preferred; nitriles; alkylnitriles, such as acetonitrile, propionitrile, butyronitrile, methoxyacetonitrile and ethoxyacetonitrile and β-hydroxy-, β-methoxy-, β-ethoxy-, β-hydroxyethoxy-, β-ethoxyethoxy-, β-propoxy- and β-butoxypropionitrile, are preferred; alkyl ketones; $C_1$-$C_4$-alkyl monoketones or $C_1$-$C_4$-alkyl diketones, such as acetone, methyl ethyl ketone and acetylacetone, are preferred; dialkylformamides; dimethylformamide and diethylformamide are preferred; 5-membered and 6-membered lactams; N-methylpyrrolidone is preferred; and 5-membered sulphones; sulpholane and sulpholene are preferred.

A preferred solvent is β-hydroxypropionitrile.

In order to achieve complete conversion, the alkylation is preferably carried out in the presence of a tertiary amine, which is substituted by bulky radicals. A large number of suitable amines are listed in British Patent specification 1,232,714. Amongst the amines mentioned, triisopropanolamine is to be singled out above all. The tertiary amines used as alkaline agents are added in an amount of 5–50 mol percent, relative to the dye base (II) to be quaternised.

The alkylation can be carried out by adding the dialkyl sulphate to a solution or suspension of the dye base (II) in the solvent at room temperature or at up to 100° C. and, respectively, warming the mixture or keeping it at this temperature. The reaction temperature is preferably 80°–120° C. and the reaction period is 0.5–12 hours.

The alkylating agent is employed, in particular, in an amount of 1–4 mols per mol of dye base.

It is necessary for the ready-to-use dyestuff solutions according to the invention to be free from dialkyl sulphates. Therefore, excess dialkyl sulphate must be destroyed after the alkylation is complete. This is achieved by warming the reaction solution after adding a substance which reacts with dialkyl sulphate. Examples of such substances which may be mentioned are: glycerol, methylglycol and ethylglycol and preferably ethylene glycol and water. The mixture is warmed, for example, for 1 hour at 80°–120° C.

If the alkylation is carried out in a solvent which reacts with the dialkyl sulphate more slowly than the dyestuff base, the excess dialkyl sulphate can also be destroyed by continuing to heat the reaction solution after the alkylation, for example for 1–6 hours at 80°–120° C.

In this way ready-to-use dyestuff solutions containing, for example, 15–55%, preferably 20–35%, of the dyestuff of the formula (VI) are obtained direct. Since the dyestuff of the formula (VI) is no longer isolated by salting out, no sodium chloride is discharged into the effluent. Surprisingly, it was found that, due to the solubilising effect of the dyestuff, solvents which have only a relatively low solubility in water give solutions which are miscible with water in all proportions.

A relatively large number of suitable heterocyclic compounds of the formula (III) as well as suitable amines, on which the diazonium salts (IV) are based, are described in French Patent Specification 1,214,986 and in British Patent specification Nos. 1,303,396 and 1,334,129.

In the formula (VI), R represents, in particular, the remaining part of an indoline, dihydropyrimid-2-one, quinoxaline or benzthiazole ring.

A preferably represents a phenyl or naphthyl ring. The rings mentioned can contain 1–3 substituents, such as alkyl, alkoxy, aralkyl, aralkoxy, halogen, carboxyl, carboxylic acid esters, carbonamide, amino, acylamino, aryl, acyl, acyloxy, aryloxy and nitro.

Preferred substituents are $C_1$-$C_4$-alkyl, $C_1$-$C_4$-alkoxy, benzyl, phenylethyl, benzyloxy, halogen, carboxyl, $C_1$-$C_4$-alkoxycarbonyl, benzyloxycarbonyl, aminocarbonyl, which is optionally substituted by one or two $C_1$-$C_4$-alkyl radicals or by a phenyl or benzyl radical, amino, acetylamino, benzoylamino, methylsulphonylamino, phenylsulphonylamino, phenyl, diphenyl, naphthyl, acetyl, benzoyl, acetoxy, benzoyloxy, phenoxy, naphthoxy or nitro. The phenyl and naphthyl radicals can, in turn, be substituted by $C_1$-$C_4$-alkyl, $C_1$-$C_4$-alkoxy or halogen.

$R_1$ preferably represents a $C_1$-$C_4$-alkyl radical, which can be substituted by halogen, hydroxyl, cyano, $C_1$-$C_4$-alkoxy, phenoxy or acetoxy, allyl, phenyl, which is optionally substituted by halogen, $C_1$-$C_4$-alkyl or $C_1$-$C_4$-alkoxy, cyclohexyl or benzyl and in particular preferentially represents methyl.

$R_3$ represents, in particular, a $C_1$-$C_5$-alkyl radical.

A preferred group of dyestuffs, solutions of which can be prepared advantageously by the new process, corresponds to the general formula

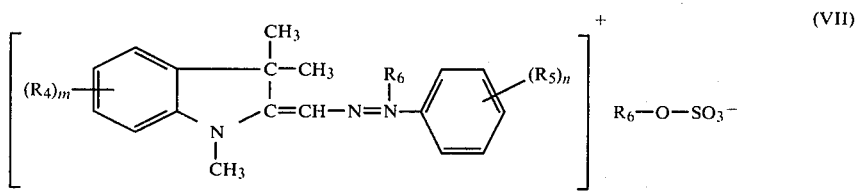

(VII)

wherein
$R_4$ and $R_5$ can denote, independently of one another, hydrogen, $C_1$-$C_4$-alkyl, $C_1$-$C_4$-alkoxy, benzyl, phenylethyl, benzyloxy, 4-methylbenzyloxy, 4-chlorobenzyloxy, chlorine, bromine, fluorine, carboxyl, methoxycarbonyl, ethoxycarbonyl, benzyloxycarbonyl, carboxylic acid methylamide, ethylamide, butylamide, benzylamide, anilide, dimethylamide or diethylamide, amino, acetylamino, benzoylamino, methylsulphonylamino, phenylsulphonylamino, phenyl, diphenyl, naphthyl, acetyl, benzoyl, acetoxy, benzoyloxy, phenoxy, naphthoxy, 4-chlorophenoxy, 4-methylphenoxy or nitro or can also represent a fused benzene ring, $R_6$ represents methyl and ethyl and m and n independently of one another denote 1 or 2.

A further preferred group of dyestuffs, solutions of which can be prepared particularly advantageously by the new process, corresponds to the general formula

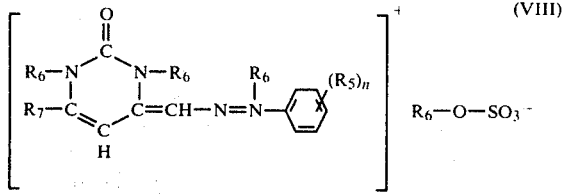

wherein

R$_5$, R$_6$ and n have the same meaning as in the formula (VII) and

R$_7$ represents hydrogen, a C$_1$-C$_4$-alkyl radical or phenyl.

When alkylation is complete, further solvents and diluents, for example organic acids, such as formic acid, acetic acid, methoxyacetic acid, ethoxyacetic acid, propionic acid, methoxypropionic acid, ethoxypropionic acid, lactic acid and diglycollic acid, or polyhydric alcohols and the esters and ethers thereof, such as glycerol, methylglycol, ethylglycol, butylglycol, diethylene glycol, 3-chloropropanediol, butane-1,3-diol, hexane-1,6-diol, diethylene glycol monoethyl ether and glycerol monoacetate, can be added to the dyestuff solutions.

In addition, emulsifiers, such as adducts of polyethylene oxide to long-chain alcohols, such as stearyl alcohol or oleyl alcohol, or to phenols, such as nonylphenol or dodecylphenol, can also be added.

Treatment of the dyestuff solutions with active charcoal, kieselgur or aluminium oxide is possible as a purification operation.

The dyestuff solutions are suitable, in particular, for dyeing polyacrylonitrile and acid-modified polyesters and polyamides.

The dyestuff solutions are distinguished by a very good storage stability even at low temperatures.

EXAMPLE 1

4-Anisidine is diazotised according to the process described in French Patent Specification No. 1,214,896 and the diazotised product is coupled with 1,3,3-trimethyl-2-methyleneindoline. The resulting dye salt is converted into the dye base by treatment with sodium hydroxide solution.

20.8 g of this dye base are stirred with 35.0 g of glycerol triacetate, 4.0 g of triisopropanolamine are added and 13.5 g of dimethyl sulphate are then added dropwise. The reaction mixture is now warmed slowly to 100° C. and stirred for two hours on a boiling water bath. The progress of the methylation is followed chromatographically. After two hours only traces of the starting material are still present. 50.0 g of ethylene glycol are now added and the solution is stirred for a further hour on a boiling water bath. The solution is then allowed to cool to room temperature and filtered. Virtually no residue remains on the filter. 122 g of a dyestuff solution, which dyes textile materials made of polyacrylonitrile in a clear golden yellow with outstanding fastness properties, are obtained.

Dyestuff solutions with equally good properties are obtained when, instead of glycerol triacetate, the following solvents are employed for the methylation: diethylene glycol dimethyl ether, dioxane, acetonitrile, propionitrile, β-hydroxypropionitrile, β-methoxypropionitrile, acetoacetic acid ethyl ester, oxalic acid diethyl ester, succinic acid diethyl ester, maleic acid dimethyl ester, adipic acid dimethyl ester, orthoformic acid triethyl ester, methylglycol acetate, ethylglycol acetate, ethylene glycol carbonate and propylene glycol carbonate.

EXAMPLE 2

4-Toluidine is diazotised in a known manner, the diazotised product is coupled with 1,3,3-trimethyl-2-methyleneindoline and the resulting dye salt is converted into the dye base by treatment with sodium hydroxide solution. 19.7 g of the dye base prepared in this way are stirred with 35.0 g of glycerol triacetate, 4.0 g of triisopropanolamine are added and 13.5 g of dimethyl sulphate are added dropwise. The reaction mixture is then warmed to 100° C. and the progress of the methylation is observed by means of a thin layer chromatogram. After two hours only traces of the starting material are still present. 68.0 g of ethylene glycol are now added and the solution is stirred for a further hour on a boiling water bath. By this means excess dimethyl sulphate is destroyed. The solution is now allowed to cool to room temperature and filtered. Virtually no residue remains on the filter. 140 g of a dyestuff solution, which dyes textile materials made of polyacrylonitrile in a neutral yellow with outstanding fastness properties, are obtained.

Dyestuff solutions with equally good properties are obtained when, in place of glycerol triacetate, the following solvents are employed for the methylation: tetrahydrofurane, dioxane, acetonitrile, propionitrile, β-hydroxypropionitrile, β-methoxypropionitrile, methylglycol acetate, ethylglycol acetate, butylglycol acetate, ethylene glycol diacetate, oxalic acid diethyl ester, malonic acid diethyl ester, succinic acid diethyl ester, maleic acid dimethyl ester, glutaric acid dimethyl ester, adipic acid dimethyl ester, cyanoacetic acid methyl ester, acetoacetic acid ethyl ester, ethylene glycol carbonate, propylene glycol carbonate, ethylene glycol dimethyl ether, glycerol 1,3-diethyl ether, diethylene glycol dimethyl ether, diethylene glycol diethyl ether and methyl ethyl ketone.

EXAMPLE 3

Aniline is diazotised in a known manner, the diazotised product is coupled with 1,3,3-trimethyl-2-methyleneindoline and the resulting dye salt is converted into the dye base by treatment with sodium hydroxide solution.

60.0 g of the dye base thus obtained are introduced into 60.0 g of β-hydroxypropionitrile, which has been prewarmed to 60° C., and 10.0 g of triisopropanolamine are added. 43.0 g of dimethyl sulphate are allowed to run in dropwise in the course of 2 hours, the bath being removed and the addition of dimethyl sulphate being so regulated that the temperature does not rise above 70° C. Thereafter, the reaction mixture is warmed to 100° C. and the progress of the methylation is followed by means of a thin layer chromatogram. After 2 hours virtually no further starting material is present. In order to destroy excess dimethyl sulphate, 20 g of ethylene glycol are now added and the solution is warmed for a further hour on a boiling water bath. 190 g of a highly concentrated dyestuff solution, which dyes textile materials made of polyacrylonitrile in a greenish-tinged yellow with very good fastness properties, are obtained.

EXAMPLE 4

Aniline is diazotised in a known manner, the diazotised product is coupled with 5-methoxy-1,3,3-trimethyl-2-methyleneindoline and the resulting dye salt is converted into the dye base by treatment with sodium hydroxide solution.

20.8 g of this dye base are stirred with 35.0 g of β-hydroxypropionitrile and 4.0 g of triisopropanolamine, 13.5 g of dimethyl sulphate are added dropwise and the reaction mixture is warmed for 2 hours at 100° C. According to the thin layer chromatogram, only traces of starting material are still present in the reaction mixture after this time. Now 50.0 g of ethylene glycol are added to the solution, which is warmed for a further hour on a boiling water bath. After the solution has cooled, it is filtered. 120 g of a dyestuff solution, which dyes textile materials made of polyacrylonitrile in a clear yellow with very good fastness properties, are obtained.

Valuable dyestuff solutions are also obtained when, in place of the above dye base, those dye bases which are obtained from the components indicated in the table which follows are employed. The colour shade indicated in the third column relates to dyeings which are obtained in polyacrylonitrile with the ready-to-use dyestuff solutions:

| Diazo component | Coupling component | Colour shade |
| --- | --- | --- |
| 4-Phenetidine | 1,3,3-Trimethyl-2-methyleneindoline | golden yellow |
| 4-Chloroaniline | 1,3,3-Trimethyl-2-methyleneindoline | greenish-tinged yellow |
| 4-Aminoacetanilide | 1,3,3-Trimethyl-2-methyleneindoline | golden yellow |
| 2-Anisidine | 1,3,3-Trimethyl-2-methyleneindoline | greenish-tinged yellow |
| 4-Toluidine | 1,3,3-Trimethyl-5-methoxy-2-methyleneindoline | reddish-tinged yellow |
| 4-Anisidine | 1,3,3-Trimethyl-5-methoxy-2-methyleneindoline | yellowish-tinged orange |
| 4-Aminoacetanilide | 1,3,3-Trimethyl-5-methoxy-2-methyleneindoline | " |
| 4-Aminodiphenyl ether | 1,3,3-Trimethyl-5-methoxy-2-methyleneindoline | " |
| 1-Amino-2,4-dimethoxybenzene | 1,3,3-Trimethyl-5-methoxy-2-methyleneindoline | reddish-tinged yellow |
| Aniline | 1,3,3-Trimethyl-5-chloro-2-methyleneindoline | greenish-tinged yellow |
| 4-Toluidine | 1,3,3-Trimethyl-5-chloro-2-methyleneindoline | yellow |
| 4-Anisdine | 1,3,3-Trimethyl-5-chloro-2-methyleneindoline | golden yellow |
| 4-Phenetidine | 1,3,3-Trimethyl-5-chloro-2-methyleneindoline | golden yellow |
| 2-Anisdine | 1,3,3-Trimethyl-5-chloro-2-methyleneindoline | greenish-tinged yellow |
| Aniline | 1,3,3-Trimethyl-5-nitro-2-methyleneindoline | golden yellow |
| 1-Amino-3,4-dimethylbenzene | 1,3,3-Trimethyl-2-methyleneindoline | reddish-tinged yellow |
| 1-Amino-2-methoxy-4-chlorobenzene | 1,3,3-Trimethyl-2-methyleneindoline | yellow |
| 1-Amino-2-methoxy-4-methylbenzene | 1,3,3-Trimethyl-2-methyleneindoline | yellow |
| 1-Amino-2-methoxy-5-methylbenzene | 1,3,3-Trimethyl-2-methyleneindoline | yellow |
| 1-Amino-2-methoxy-5-chlorobenzene | 1,3,3-Trimethyl-2-methyleneindoline | greenish-tinged yellow |
| 1-Amino-3-chloro-4-methoxybenzene | 1,3,3-Trimethyl-2-methyleneindoline | golden yellow |
| 1-Amino-2,4-dimethoxybenzene | 1,3,3-Trimethyl-2-methyleneindoline | golden yellow |
| 1-Amino-2,5-dimethoxybenzene | 1,3,3-Trimethyl-2-methyleneindoline | reddish-tinged yellow |
| 2-Aminodiphenyl ether | 1,3,3-Trimethyl-2-methyleneindoline | greenish-tinged yellow |
| 4-Aminodiphenyl ether | 1,3,3-Trimethyl-2-methyleneindoline | golden yellow |
| 4-Aminobenzoic acid ethyl ester | 1,3,3-Trimethyl-2-methyleneindoline | greenish-tinged yellow |
| 2-Aminonaphthalene | 1,3,3-Trimethyl-2-methyleneindoline | golden yellow |
| 4-Anisidine | 1,3,3-Trimethyl-7-chloro-2-methyleneindoline | golden yellow |
| 4-Anisidine | 1,3,3-Trimethyl-2-methyleneindoline-5-carboxylic acid methyl ester | orange |
| 4-Toluidine | 1,3,3-Trimethyl-2-methyleneindoline-5-carboxylic acid methyl ester | golden yellow |
| Aniline | 1,3,3-Trimethyl-2-methyleneindoline-5-carboxylic acid methyl ester | yellow |
| 4-Anisdine | 1-Ethyl-3,3-dimethyl-benzo-(6,7)-2-methyleneindoline | reddish-tinged orange |
| Aniline | 1,3,3,5-Tetramethyl-2-methyleneindoline | greenish-tinged yellow |
| 4-Toluidine | 1,3,3,5-Tetramethyl-2-methyleneindoline | yellow |
| 4-Anisidine | 1,3,3,5-Tetramethyl-2-methyleneindoline | golden yellow |
| 4-Phenetidine | 1,3,3,5-Tetramethyl-2-methyleneindoline | golden yellow |
| 1-Amino-3-chloro-4-methoxybenzene | 1,3,3,5-Tetramethyl-2-methyleneindoline | yellowish-tinged orange |
| Aniline | 1,3,4-Trimethyl-6-methylenedihydropyrimid-2-one | yellow |

| Diazo component | Coupling component | Colour shade |
| --- | --- | --- |
| 4-Toluidine | 1,3,4-Trimethyl-6-methylene-dihydropyrimid-2-one | reddish-tinged yellow |
| 4-Anisidine | 1,3,4-Trimethyl-6-methylene-dihydropyrimid-2-one | yellowish-tinged orange |
| 4-Chloroaniline | 1,3,4-Trimethyl-6-methylene-dihydropyrimid-2-one | yellowish-tinged orange |
| 2-Aminonaphthalene | 1,3,4-Trimethyl-6-methylene-dihydropyrimid-2-one | yellowish-tinged orange |
| Aniline | 1,3-Dimethyl-6-methylene-dihydropyrimid-2-one | yellow |
| 4-Toluidine | 1,3-Dimethyl-6-methylene-dihydropyrimid-2-one | reddish-tinged yellow |
| 4-Anisidine | 1,3-Dimethyl-6-methylene-dihydropyrimid-2-one | golden yellow |
| Aniline | 1,3,-Dimethyl-4-phenyl-6-methylene-dihydropyrimid-2-one | yellow |

EXAMPLE 5

19.7 g of the dye base employed in Example 2 are stirred with 35.0 g of β-methoxypropionitrile and 4.0 g of triisopropanolamine, 16.5 g of diethyl sulphate are added and the mixture is stirred for three hours on a boiling water bath. A further 5.0 g of diethyl sulphate are then added and the reaction mixture is warmed for two hours at 100° C. In order to destroy the excess diethyl sulphate, 68.0 g of ethylene glycol are now added and the solution is warmed at 100° C. for one hour. It is then cooled and filtered. Virtually no residue remains on the filter. A dyestuff solution which dyes textile materials made of polyacrylonitrile in a reddish-tinged yellow with very good fastness properties is obtained.

If 22.0 g of dibutyl sulphate are used in place of 16.5 g of diethyl sulphate and then 5.0 g of dibutyl sulphate are used in place of 5.0 g of diethyl sulphate, a stable dyestuff solution which also dyes polyacrylonitrile in a reddish-tinged yellow is obtained.

EXAMPLE 6

19.7 g of the dye base employed in Example 2 are stirred with 70.0 g of β-hydroxypropionitrile, 4.0 g of triisopropanolamine are added and 13.5 g of dimethyl sulphate are added dropwise. The reaction mixture is then warmed to 100° C. and the progressive methylation is observed by means of a thin layer chromatogram. After 2 hours only traces of the starting material are still present. The mixture is warmed for a further 2 hours at 100° C. and the solution is then allowed to cool to room temperature and filtered. Virtually no residue remains on the filter. 107 g of a dyestuff solution which dyes textile materials made of polyacrylonitrile in a neutral yellow are obtained.

I claim:

1. Process for the preparation of a solution of the basic dyestuff of the formula

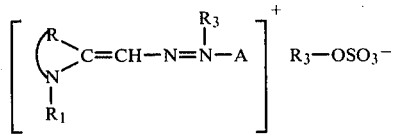

wherein

R is the remaining part of a 5-membered or 6-membered heterocyclic ring;

$R_1$ is alkyl, alkenyl, cycloalkyl, aralkyl, aryl, haloaryl, $C_1$-$C_4$-alkaryl, $C_1$-$C_4$-alkoxyaryl, or alkyl substituted by halogen, hydroxyl, cyano, $C_1$-$C_4$-alkoxy, phenoxy, or acetoxy;

$R_3$ is alkyl; and

A is phenyl, naphthyl, or either of phenyl or naphthyl substituted 1-3 times with alkyl, alkoxy, aralkyl, aralkoxy, halogen, carboxyl, carboxylic acid esters, carbonamide, amino, acylamino, aryl, acyl, acyloxy, aryloxy, or nitro; the process comprising reacting a dye base of the formula:

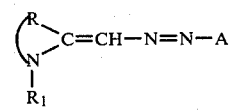

with a dialkyl sulphate of the formula

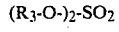

in glycerol triacetate, methylglycol acetate, ethylglycol acetate, ethylene glycol diacetate, β-methoxypropionitrile, β-hydroxypropionitrile, γ-butyrolactone, ethylene glycol carbonate, or propylene glycol carbonate.

* * * * *